United States Patent
Eber et al.

(10) Patent No.: US 10,405,026 B2
(45) Date of Patent: *Sep. 3, 2019

(54) METHODS, DEVICES AND SYSTEMS FOR AUDIOVISUAL SYNCHRONIZATION WITH MULTIPLE OUTPUT DEVICES

(71) Applicant: DISH Technologies L.L.C., Englewood, CO (US)

(72) Inventors: Samuel Eber, Denver, CO (US); Eric Pleiman, Centennial, CO (US); Jesus Flores Guerra, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,381

(22) Filed: Jun. 26, 2018

(65) Prior Publication Data

US 2018/0310048 A1   Oct. 25, 2018

Related U.S. Application Data

(63) Continuation of application No. 14/566,364, filed on Dec. 10, 2014, now Pat. No. 10,034,035.

(51) Int. Cl.
| | |
|---|---|
| *H04N 21/43* | (2011.01) |
| *G06F 16/335* | (2019.01) |
| *H04N 21/6547* | (2011.01) |
| *H04N 21/242* | (2011.01) |
| *H04N 21/485* | (2011.01) |
| *H04N 21/6543* | (2011.01) |
| *H04N 21/274* | (2011.01) |

(Continued)

(52) U.S. Cl.
CPC ....... *H04N 21/4307* (2013.01); *G06F 16/337* (2019.01); *H04N 21/242* (2013.01); *H04N 21/252* (2013.01); *H04N 21/25833* (2013.01); *H04N 21/25891* (2013.01); *H04N 21/274* (2013.01); *H04N 21/4104* (2013.01); *H04N 21/4341* (2013.01); *H04N 21/43637* (2013.01); *H04N 21/485* (2013.01); *H04N 21/4852* (2013.01); *H04N 21/6543* (2013.01); *H04N 21/6547* (2013.01); *H04N 21/237* (2013.01)

(58) Field of Classification Search
CPC ........... H04N 21/4307; H04N 21/6547; H04N 21/242; H04N 21/485; H04N 21/6543; H04N 21/274; H04N 21/4852; H04N 21/43637; H04N 21/4341; H04N 21/4104; H04N 21/25891; H04N 21/25833; H04N 21/252; H04N 21/237; G06F 16/337

See application file for complete search history.

(56) References Cited

U.S. PATENT DOCUMENTS

| | | | |
|---|---|---|---|
| 10,034,035 B2* | 7/2018 | Eber | H04N 21/242 |
| 10,080,061 B1* | 9/2018 | Kirley | H04N 21/4852 |
| 2008/0209482 A1* | 8/2008 | Meek | H04N 5/607 |
| | | | 725/105 |

* cited by examiner

*Primary Examiner* — Benjamin R Bruckart
*Assistant Examiner* — Tien M Nguyen
(74) *Attorney, Agent, or Firm* — Lorenz & Kopf, LLP

(57) ABSTRACT

Methods, devices and systems are provided for provisioning an output device for use with a media device to produce synchronized audio and video portions of media content. An exemplary method involves a media device identifying a device type associated with the output device, obtaining synchronization settings for the device type from a server via a network, and presenting audiovisual content in accordance with the synchronization settings obtained from the server.

20 Claims, 8 Drawing Sheets

(51) Int. Cl.
*H04N 21/4363* (2011.01)
*H04N 21/434* (2011.01)
*H04N 21/41* (2011.01)
*H04N 21/258* (2011.01)
*H04N 21/25* (2011.01)
*H04N 21/237* (2011.01)

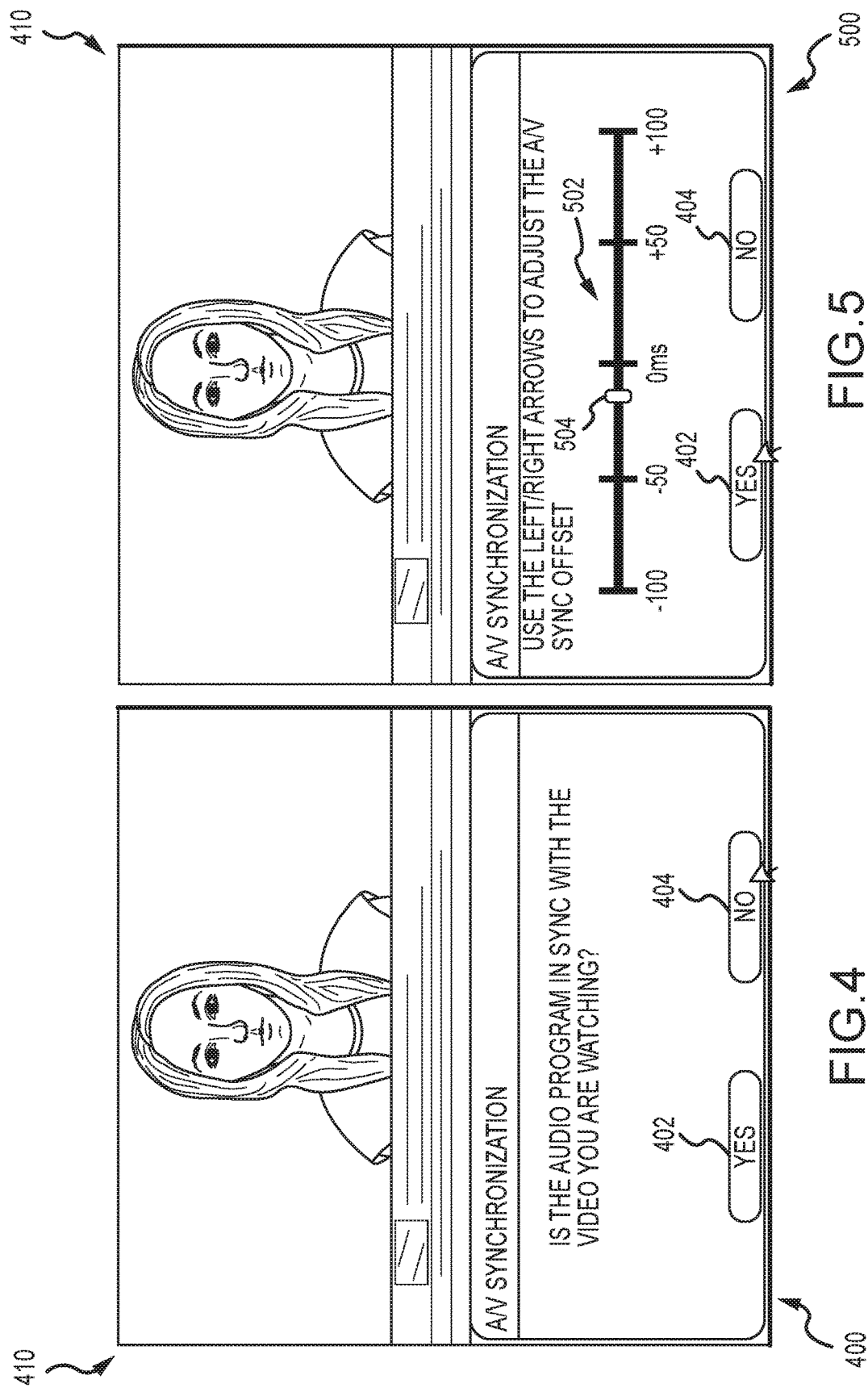

METHODS, DEVICES AND SYSTEMS FOR AUDIOVISUAL SYNCHRONIZATION WITH MULTIPLE OUTPUT DEVICES

CROSS-REFERENCE TO RELATED APPLICATION

This application is a continuation of U.S. patent application Ser. No. 14/566,364, filed Dec. 10, 2014.

TECHNICAL FIELD

The following description generally relates to provisioning a media device for presenting synchronized audiovisual content using multiple output devices.

BACKGROUND

In recent times, wireless communications have become ubiquitous and have replaced or surpassed many previous communications technologies. For example, rather than using a physical connection, such as a wire, cable, or the like to establish communications between two devices, many modern devices are equipped for wireless communications with other devices. However, wireless communications can also introduce additional delays or lag associated with encoding, transmitting, receiving, and decoding wireless packets and reconstructing the original content. Such delays can interfere with presentation of audiovisual content and result in a perceptible loss of synchronization when different playback devices are used to separately present the audio and the video content, and wireless communications are utilized to transmit the audio content and/or the video content to the appropriate playback device. Unsynchronized presentation of audiovisual content often results in a negative viewer experience. Accordingly, it is desirable to maintain synchronization between audio and video content in a manner that minimizes the impact on the user experience. Other desirable features and characteristics may also become apparent from the subsequent detailed description and the appended claims, taken in conjunction with the accompanying drawings and this background section.

BRIEF SUMMARY

According to various exemplary embodiments, systems, devices and methods are provided for provisioning output devices for use with a media device, such as a set-top box or the like. One exemplary method involves a media device identifying a device type associated with the output device, obtaining synchronization settings for the device type from a remote server via a network, and presenting audiovisual content in accordance with those synchronization settings.

In other embodiments, an apparatus for a media device is provided. The media device includes a wireless communications module to communicate with an audio output device, a display interface, and a control module coupled to the wireless communications module and the display interface. The control module is also coupled to a network to obtain, via the network, synchronization settings for a device type associated with the audio output device, provide video content of a media program to the display interface for presentation on a display device, and provide audio content of the media program to the wireless communications module for transmission to the audio output device, wherein one of the audio content and the video content is delayed relative to the other of the audio content and the video content based on the synchronization settings.

In another embodiment, a method of provisioning a media device for presenting audiovisual content using an instance of an output device type involves a server obtaining a plurality of synchronization settings from a plurality of media devices for presenting synchronized audiovisual content using a respective instance of the output device type associated with the respective media device of the plurality of media devices and determining default synchronization settings for the output device type based at least in part on the plurality of synchronization settings. The server further receives a request identifying the output device type from a media device via a network, and provides the default synchronization settings to the media device via the network in response to the request. The media device presents the audiovisual content using the instance of the output device type in accordance with the default synchronization settings.

Various embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements, and FIG. 1 is a block diagram of a media system in accordance with one or more embodiments;

FIGS. 4-5 depict graphical user interface displays that may be presented on a display device by a media device in the media system of FIG. 1 in conjunction with the synchronization process of FIG. 3 in one or more embodiments;

Figure 1:
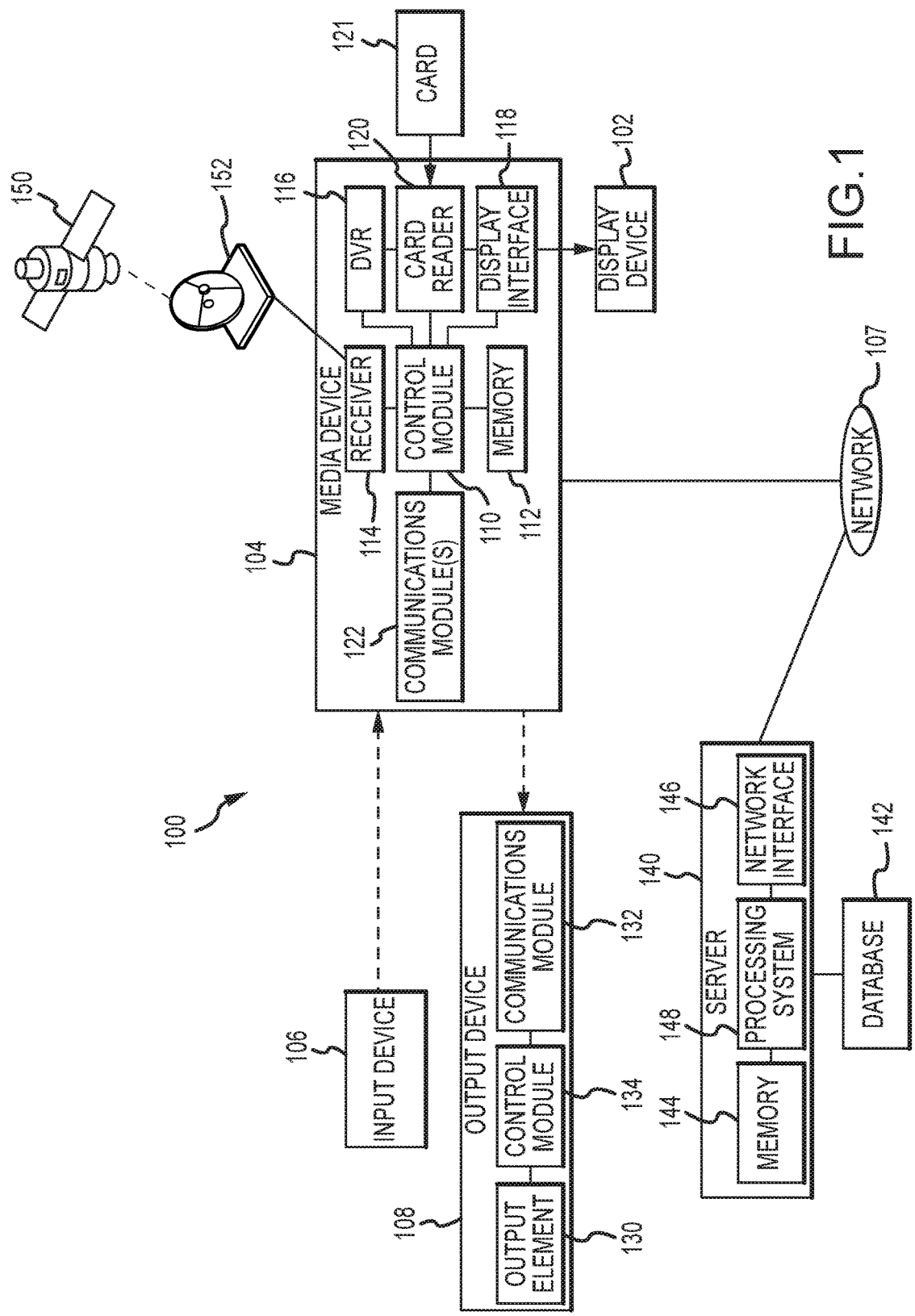
Figure 3:
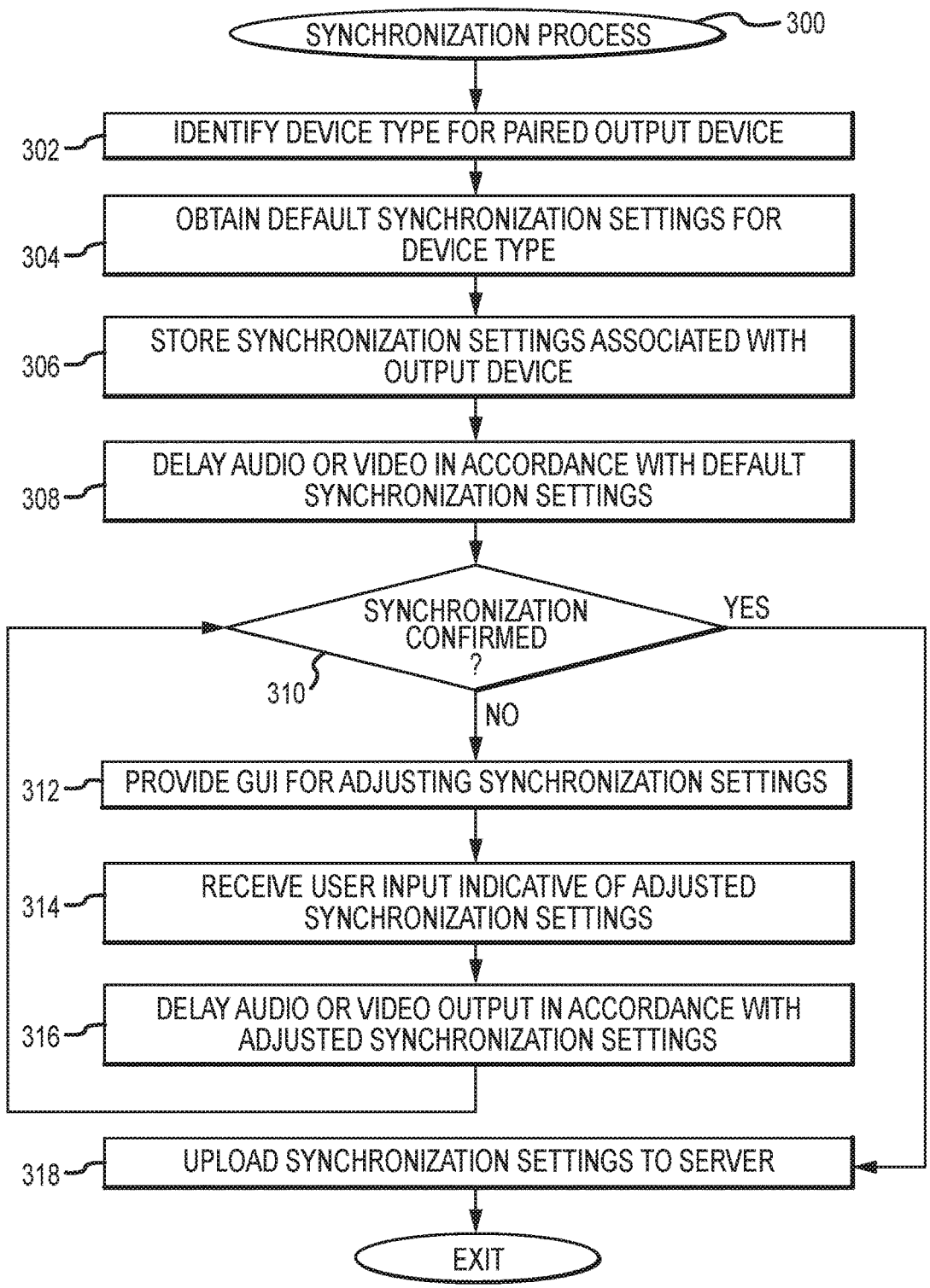
FIG. 3 is a flowchart of an exemplary synchronization process suitable for use with the media system of FIG. 1 in accordance with one or more embodiments.
Figure 6:
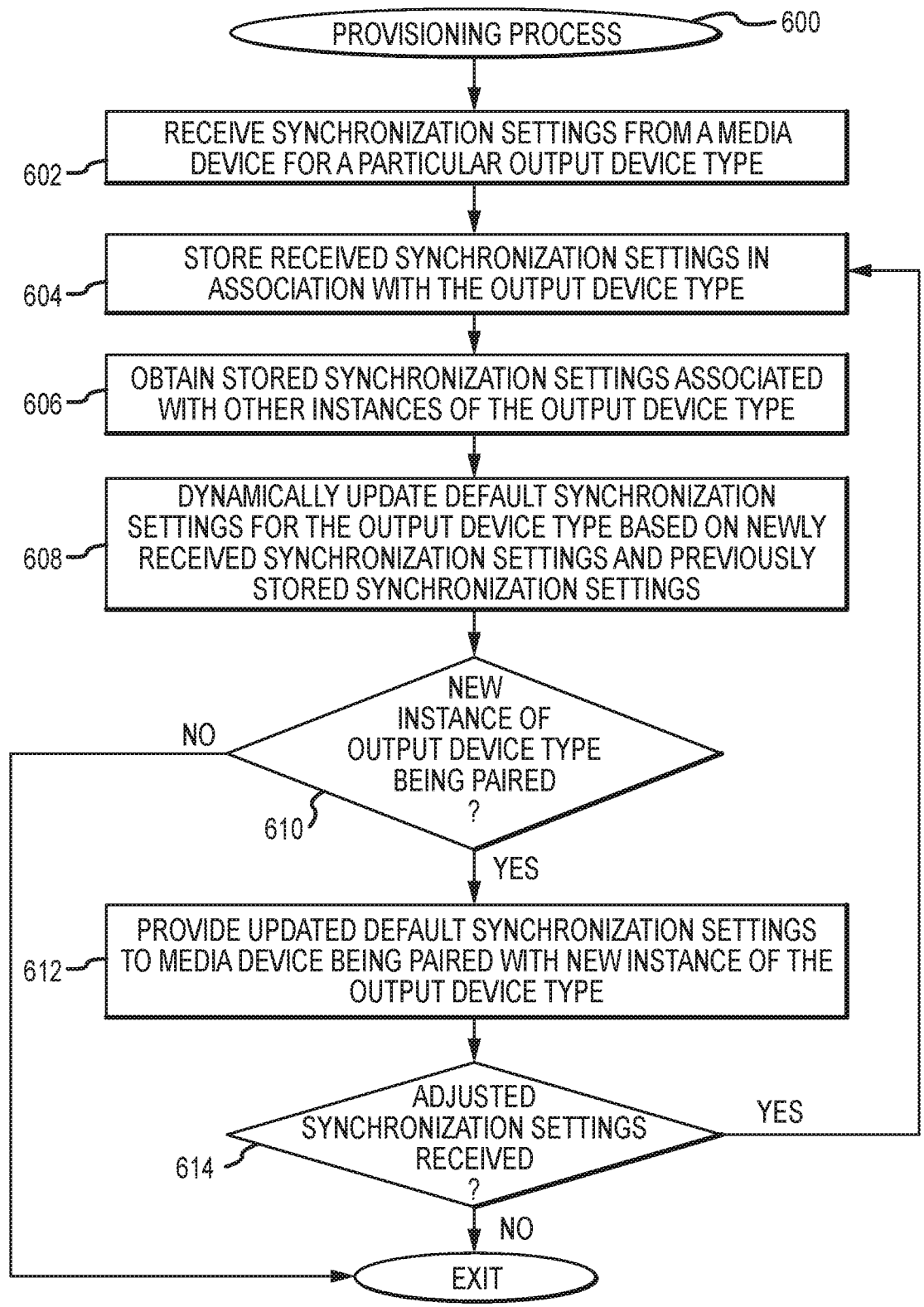
FIG. 6 is a flowchart of an exemplary provisioning process suitable for use with the media system of FIG. 1 in accordance with one or more embodiments.
Figure 8:
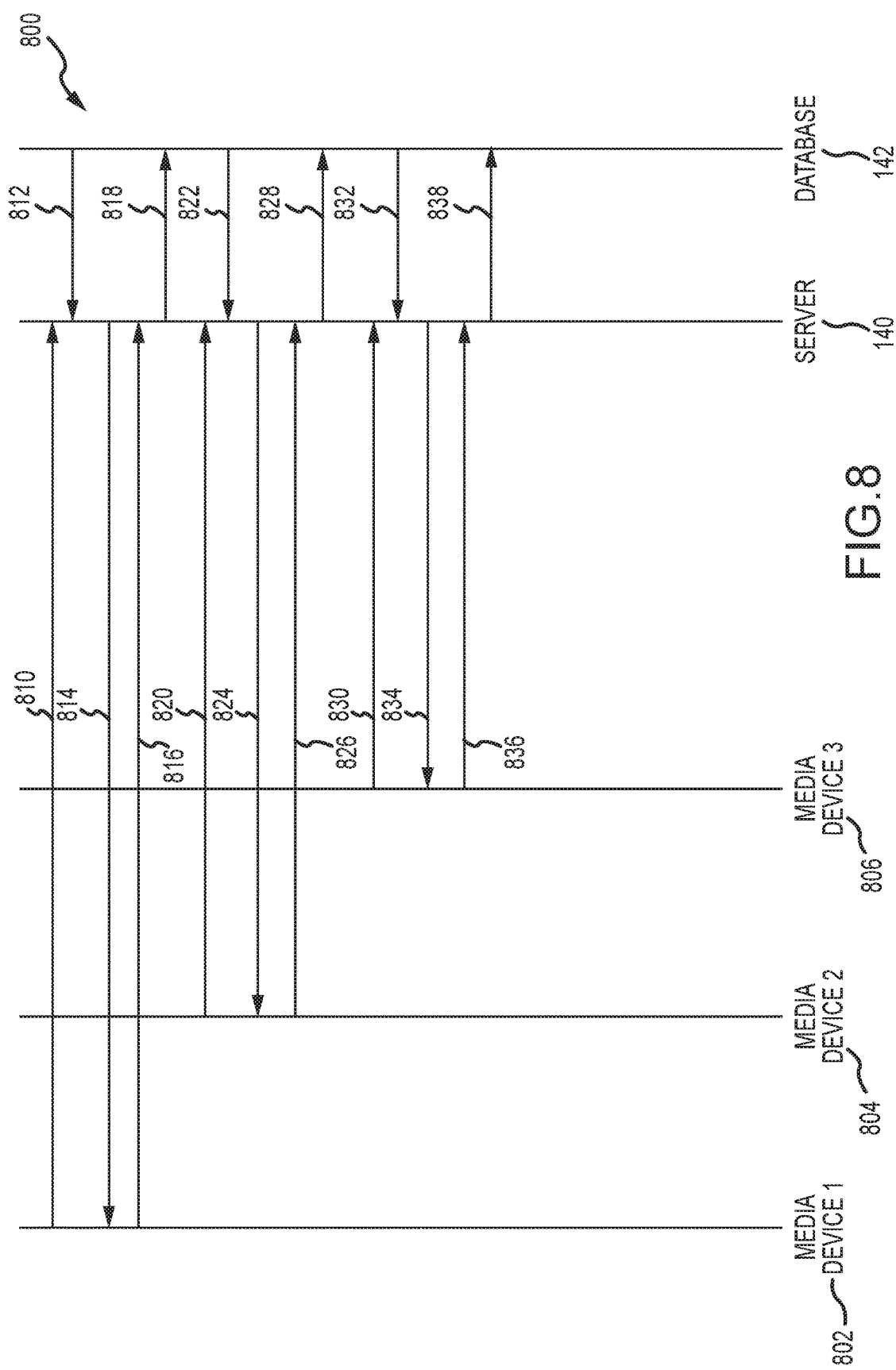
Figure 9:
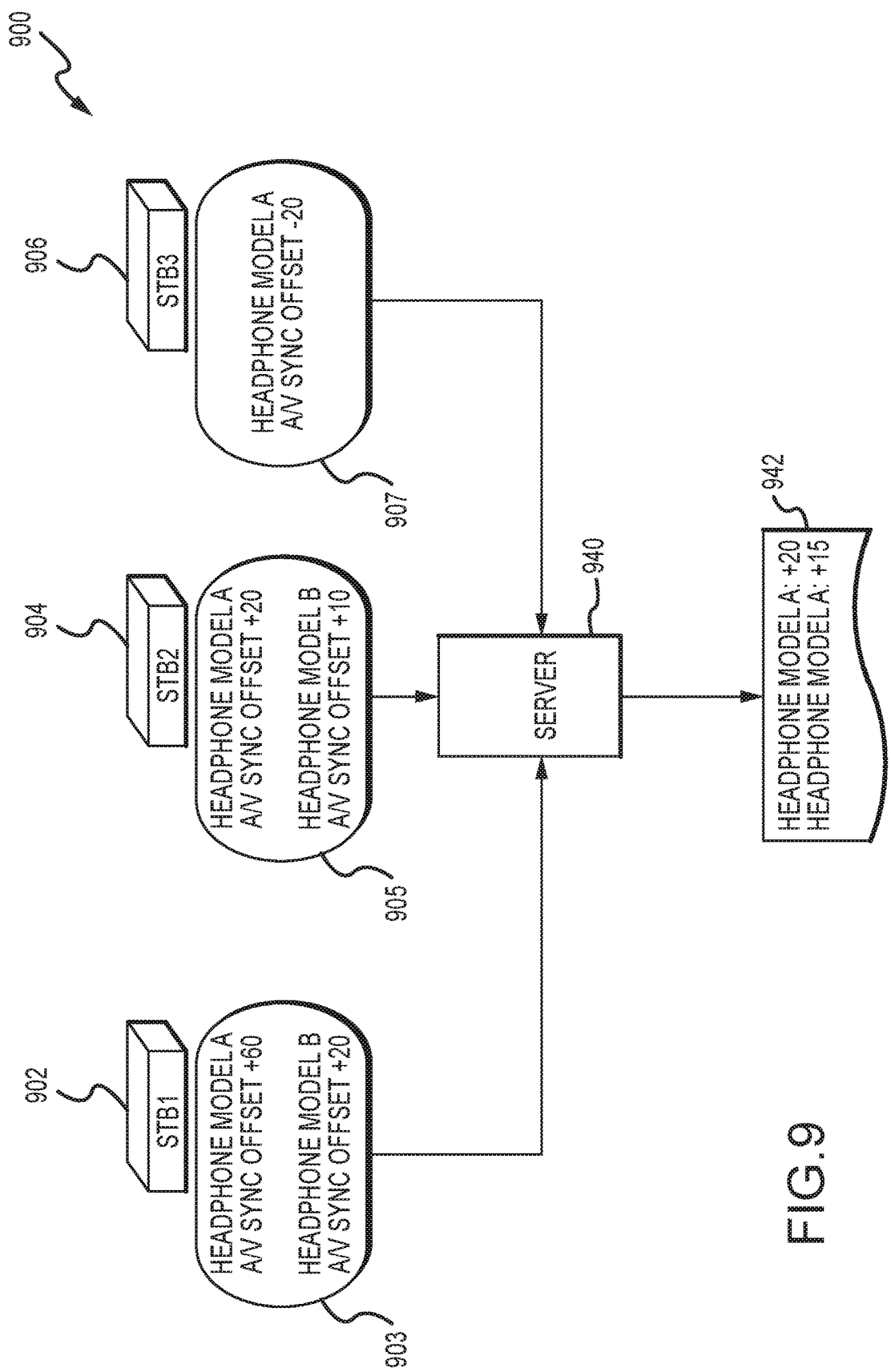

FIG. 8 is a diagram illustrating a sequence of communications involving the remote server in the media system of FIG. 1 in accordance with one exemplary embodiment of the provisioning process of FIG. 6 in conjunction with the synchronization process of FIG. 3 for multiple instances of a media device; and FIG. 9 is a block diagram of a media system illustrating the determination of default synchronization settings in an exemplary embodiment.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Embodiments of the subject matter described herein generally relate to synchronizing presentation of audio and video portions of media content on separate output (or playback) devices. As used herein, "media content," "media program," or variants thereof should be understood as referring to any audiovisual programming or content in any streaming, file-based or other format, with "audio portion" or "audio content" referring to the audio component of the media content and "video portion" or "video content" referring to the video component of the media content.

In exemplary embodiments described herein, a server determines default synchronization settings for a particular type of output device (or a particular combination of output device types) based on synchronization settings utilized for other instances of that particular type of output device (or output device combination). In this regard, the server may communicate with a plurality of media devices over a network, with each of the media devices uploading its synchronization settings used to present synchronized audiovisual content using a particular output device type. The synchronization settings dictate the amount by which to delay either the audio portion of media content or the video portion of media content to obtain a synchronized presentation of the audio content by an audio output device and the video content by a video output device. The server may average the uploaded synchronization settings or otherwise calculate an aggregate representation of the synchronization settings used for the various instances of a particular output device type, resulting in default synchronization settings for that particular output device type.

When a new instance of that particular output device type is instantiated with a media device, the media device identifies the output device type to be provisioned and downloads or otherwise obtains, from the server, the default synchronization settings determined by the server for that output device type. Thereafter, the media device automatically configures itself to provide audio and video content to the respective playback devices in accordance with the downloaded default synchronization settings. Thereafter, the media device presents the media content in accordance with the default synchronization settings by delaying the audio or video portion as appropriate, so that the audio content reproduced by the audio output device is synchronized with the video content presented by the video output device.

When a viewer perceives the audiovisual content as being out of sync, the viewer may adjust the synchronization settings (e.g., by increasing or decreasing the delay of one portion of content relative to the other portion) using a graphical user interface (GUI) generated by the media device until the user perceives the audio and video as being synchronized. In response to receiving indication from the viewer that the adjusted synchronization settings result in synchronized audiovisual content, the media device may configure itself to provide the audio and video content to the respective playback devices in accordance with the adjusted synchronization settings. Additionally, in exemplary embodiments, the media device uploads or otherwise transmits the adjusted synchronization settings to the server. Thereafter, the server uses the adjusted synchronization settings for this instance of the output device type in conjunction with the stored synchronization settings for other instances of that particular output device type to determine updated default synchronization settings for that particular output device type. In this manner, as new instances of a particular output device type are introduced and used with different media devices, the server may dynamically update the default synchronization settings to reflect the manual adjustments to the default synchronization settings made by viewers associated with the new instances of the output device type. As described in greater detail below, in various embodiments, the default synchronization settings may also be associated with or otherwise specific to the particular communications protocol(s) used by a media device to communicate with the output device(s), the particular encoding or file formats for the audio and video content, and/or the particular device type associated with the media device.

FIG. 1 depicts a media system 100 configured to present a media program (or media content) on a display device 102 associated with a media device 104. The media device 104 is communicatively coupled to an input device 106 that functions as a user interface enabling user interaction with the media device 104 to control, manipulate, or otherwise influence the operation of the media device 104 and/or the content presented on the display device 102. Additionally, the media system 100 includes an output device 108 communicatively coupled to the media device 104 for presenting at least a portion of the media content on the output device 108. In exemplary embodiments described herein, the output device 108 is realized as an audio output device configured to produce auditory output corresponding to the audio portion of the media content having its video content concurrently presented on the display device 102. However, in other embodiments, the output device 108 may configured to graphically present or otherwise display the video portion of the media content, or present both the audio and the video of the media content. That said, for purposes of explanation, but without limitation, the output device 108 may alternatively be referred to herein as an audio output device. Additionally, although FIG. 1 depicts the input device 106 and the output device 108 as physically distinct or separate components, in some alternative embodiments, the input device 106 and the output device 108 may be integrated in a common device or a common housing.

The input device 106 generally represents an electronic device that is paired or otherwise associated with the media device 104 in a manner that allows the input device 106 to control operation of the media device 104. In exemplary embodiments, the input device 106 is realized as a remote control associated with the media device 104 that communicates with the media device 104 wirelessly in a point-to-point manner. However, in other embodiments, the input device 106 may be realized as a mobile telephone, a laptop or notebook computer, a tablet computer, a desktop computer, a personal digital assistant, a video game player, a portable media player and/or any other computing device capable of communicating with the media device 104. That said, for purposes of explanation, the input device 106 may be described herein in the context of a remote control paired with the media device 104. In exemplary embodiments, the input device 106 includes one or more user input elements for receiving input from a viewer of the display device 102 that is in possession of the input device 106. The user input elements may include, for example, one or more buttons, keys, keypads, keyboards, directional pads, joysticks, pointers, mice, touch panels or other touch-sensing elements, or the like. In exemplary embodiments, input received by the input element may be replicated or otherwise presented on the display device 102. For example, a position of a GUI element on the display device 102, such as a pointer or cursor, may be correlated with the user input on the input element.

The output device 108 is also realized as an electronic device that is also paired or otherwise associated with the media device 104 in a manner that allows the output device 108 to present or otherwise reproduce at least a portion of media content available at the media device 104. In exemplary embodiments, the output device 108 is realized as an audio output device (e.g., headphones, earbuds, a sound bar, or the like) associated with the media device 104 that communicates with the media device 104 wirelessly in a point-to-point manner. The illustrated output device 108 includes at least one output element 130 configured to present, reproduce, or otherwise output at least a portion of audiovisual media content, at least one wireless communications module 132 configured to support communications with the media device 104 over a wireless communications channel, and a control module 134 configured to support operations of the output device 108. For an audio output device 108, the output element 130 may be realized as one or more speakers. In one or more exemplary embodiments, the wireless communications module 132 supports wireless communications over an unlicensed radio band, such as, for example, using a 2.4 GHz carrier frequency in accordance with a particular communications protocol or specification. The control module 134 may be realized as any suitable combination of hardware, firmware, and/or other components of the output device 108 capable of operating the communications module 132 to pair or otherwise associate the output device 108 with the media device 104 and receive at least a portion of media content from the media device 104. The control module 134 may also decode or otherwise process the received content and generate corresponding output signals provided to the audio output element 130, which, in turn, produces the audio content corresponding to those output signals.

In the illustrated embodiment of FIG. 1, the media device 104 is any electronic device, hardware, or other component capable of receiving and processing media content and providing media content to the display device 102 for presentation on the display device 102. The display device 102 generally represents a television, monitor, liquid crystal display (LCD), light emitting diode (LED) display, plasma display, or the like that graphically presents, renders, or otherwise displays imagery and/or video corresponding to media content provided by the media device 104. In exemplary embodiments, the media device 104 is a set-top box (STB) or similar system that is able to receive television programming and/or to record certain media programs. Exemplary embodiments of media device 104 will therefore include a receiver interface 114 for receiving satellite, cable and/or broadcast programming signals from broadcast content sources 150, as well as a data storage medium 116 (e.g., a hard disk, flash memory, or another suitable non-volatile data storage element) to support a digital video recorder (DVR) feature and/or functionality, and a display interface 118 for providing imagery and/or video corresponding to a media program to the display device 102. For convenience, but without limitation, the data storage medium 116 is alternatively referred to herein as a DVR. In some embodiments, the media device 104 may also include an access card interface or card reader 120 adapted to receive an access card 121 (or viewing card) configured to ensure that the viewer is authorized to view media content provided to the display device 102. In this regard, the access card 121 may include unique identification information associated with a particular subscriber to the broadcast content source 150 or otherwise include information that facilitates receiving and/or decoding media content provided by the broadcast content source 150.

The media device 104 also includes a plurality of communications modules 122 configured to support communications to/from the media device 104, as described in greater detail below. In this regard, the media device 104 includes at least one wireless communications module configured to support wireless communications with the input device 106 and the audio output device 108. Additionally, in the illustrated embodiment of FIG. 1, at least one of the communications modules 122 of the media device 104 is configured to support communications with a remote server 140 via a communications network 107. For example, one of the communications modules 122 may be realized as a cellular transceiver, a wired network interface controller (e.g., an Ethernet adapter), or another suitable network interface.

It should be appreciated that FIG. 1 depicts merely one exemplary embodiment of a media device 104, and in practice, the media device 104 may be physically and/or logically implemented in any manner to suit the needs of a particular embodiment. In this regard, in some embodiments, the components in media device 104 may be provided within a common chassis or housing as illustrated in FIG. 1, although equivalent embodiments may implement media device 104 with any number of inter-connected but discrete components or systems. For example, in some embodiments, the media device 104 may be realized as a combination of a STB and a placeshifting device, wherein some features of the media device 104 (e.g., the DVR 116, the receiver 114, the display interface 118, communications modules 122) are implemented by the STB and other features of the media device 104 (e.g., the network interface 124) are implemented by the placeshifting device, wherein the placeshifting device works in conjunction with the STB to shift the viewing experience from a home television (e.g., display device 102) to another display that is accessed via network (e.g., network 107). Examples of placeshifting devices that may be used in some embodiments of media device 104 could include any of the various SLINGBOX products available from Sling Media of Foster City, Calif., although other products or services could be used in other embodiments. Many different types of placeshifting devices are generally capable of receiving media content from an external source, such as any sort of DVR or STB, cable or satellite programming source, DVD player, content servers, and/or the like. In other embodiments, placeshifting features are incorporated within the same device that provides content-receiving or other capabilities. Media device 104 may be a hybrid DVR and/or receiver, for example, that also provides transcoding and placeshifting features.

Still referring to FIG. 1, in the illustrated embodiment, media device 104 is capable of receiving digital broadcast satellite (DBS) signals transmitted from a broadcast source 150, such as a satellite, using an antenna 152 that provides received signals to the receiver 114. Equivalent embodiments, however, could receive programming at receiver 114 from any sort of cable connection, broadcast source, removable media, network service, external device and/or the like. The DVR 116 feature stores recorded programming (e.g., broadcast programming received via receiver 114) on a hard disk drive, memory, or other storage medium as appropriate in response to user/viewer programming instructions, wherein the recorded programming may be subsequently viewed on display device 102 or placeshifted to another client device via a network. Content stored in DVR 116 may be any sort of file-based programming or other content that is accessible to media device 104. Additionally, media content in DVR 116 may be stored in any sort of compressed or uncompressed format, as desired, and may be encoded or transcoded as desired for effective receipt, storage, retrieval and playing.

The media device 104 includes a control module 110 configured to direct, manage, or otherwise control the operations of the media device 104 as appropriate. The control module 110 may be realized as any suitable combination of hardware, firmware, and/or other components of the media device 104 capable of directing, managing or otherwise controlling the operations of media device 104. The control module 110 may be realized using any suitable processing system, processing device, or combination thereof. For example, the control module 110 may include one or more processors, central processing units (CPUs), graphics processing units (GPUs), controllers, microprocessors, microcontrollers, processing cores and/or other computing resources configured to support the subject matter described herein. The media device 104 also includes a data storage element (or memory) 112 that is coupled to or otherwise accessed by the control module 110. The memory 112 may be realized using as random access memory (RAM), read only memory (ROM), flash memory, magnetic or optical mass storage, or any other suitable configuration of non-transitory short or long term data storage or other non-transitory computer-readable media capable of storing programming instructions for execution by the control module 110. The stored programming instructions, when read and executed by the control module 110, cause the control module 110 to perform various tasks, functions, and/or processes to control operations of the media device 104 and support the subject matter described herein. In some embodiments, the control module 110 is implemented as a "system on a chip" (SoC) that incorporates a hybrid microcontroller with memory, input/output and other features to perform the various processing and other functionality of media device 104, and in which case a separate memory 112 may not be provided.

As described in greater detail below, in exemplary embodiments, the remote server 140 communicates with multiple instances of the media device 104 over the network 107, and receives, from each respective instance of the media device 104, synchronization settings used by the respective media device to reproduced synchronized audio-visual content using a particular type of output device that is physically and/or logically separate from the display device associated with the respective media device. The remote server 140 stores or otherwise maintains the synchronization settings used for the various instances of media devices in the media system 100 in a suitable data storage element, such as database 142. The remote server 140 calculates or otherwise determines default synchronization settings for a particular type of output device based on respective synchronization settings utilized by respective instances of media devices for that particular type of output device. Thereafter, the default synchronization settings for the device type associated with the output device 108 may be downloaded, retrieved, or otherwise obtained, from the server 140 via the network 107, upon pairing a new instance of the output device type (e.g., output device 108) with another media device 104.

As described in greater detail below, in exemplary embodiments, the media device 104 automatically configures itself to provide the audio and video portions of the media content to the appropriate output devices 102, 108 in accordance with the default synchronization settings received from the remote server 140. Thereafter, a viewer of the display device 102 may interact with the media device 104 to modify or otherwise adjust the synchronization settings to improve the synchronization of the auditory output provided by the audio output device 108 and/or audio output element 130 with the video output provided by the display device 102. After adjustment, the media device 104 may upload, transmit, or otherwise provide the adjusted synchronization settings to the remote server 140 via the network 107. In turn, the remote server 140 stores or otherwise maintains the adjusted synchronization settings associated with the media device 104 for the device type associated with the audio output device 108. Thereafter, the remote server 140 utilizes the adjusted synchronization settings associated with the media device 104 in conjunction with the synchronization settings for other instances of the output device type stored in the database 142 to dynamically calculate updated default synchronization settings for provisioning subsequent instances of the output device type, as described in greater detail below.

In exemplary embodiments, the remote server 140 includes a processing system 148 that is coupled to a network interface 146 and a data storage element 144 (or memory). The processing system 148 may be realized using any suitable processing system and/or devices, such as, for example, one or more processors, central processing units (CPUs), graphics processing units (GPUs), controllers, microprocessors, microcontrollers, processing cores and/or other computing resources configured to support the subject matter described herein. The network interface 146 generally represents the component, hardware or the like of the server 140 that facilitates communications with the network 107. The data storage element 144 may be realized using any suitable non-transitory short or long term data storage or other non-transitory computer-readable media capable of storing programming instructions for execution by the processing system 148. The stored programming instructions, when read and executed by the processing system 148, cause processing system 148 to support or otherwise perform one of more tasks, functions, operations, and/or processes described herein.

Figure 2:
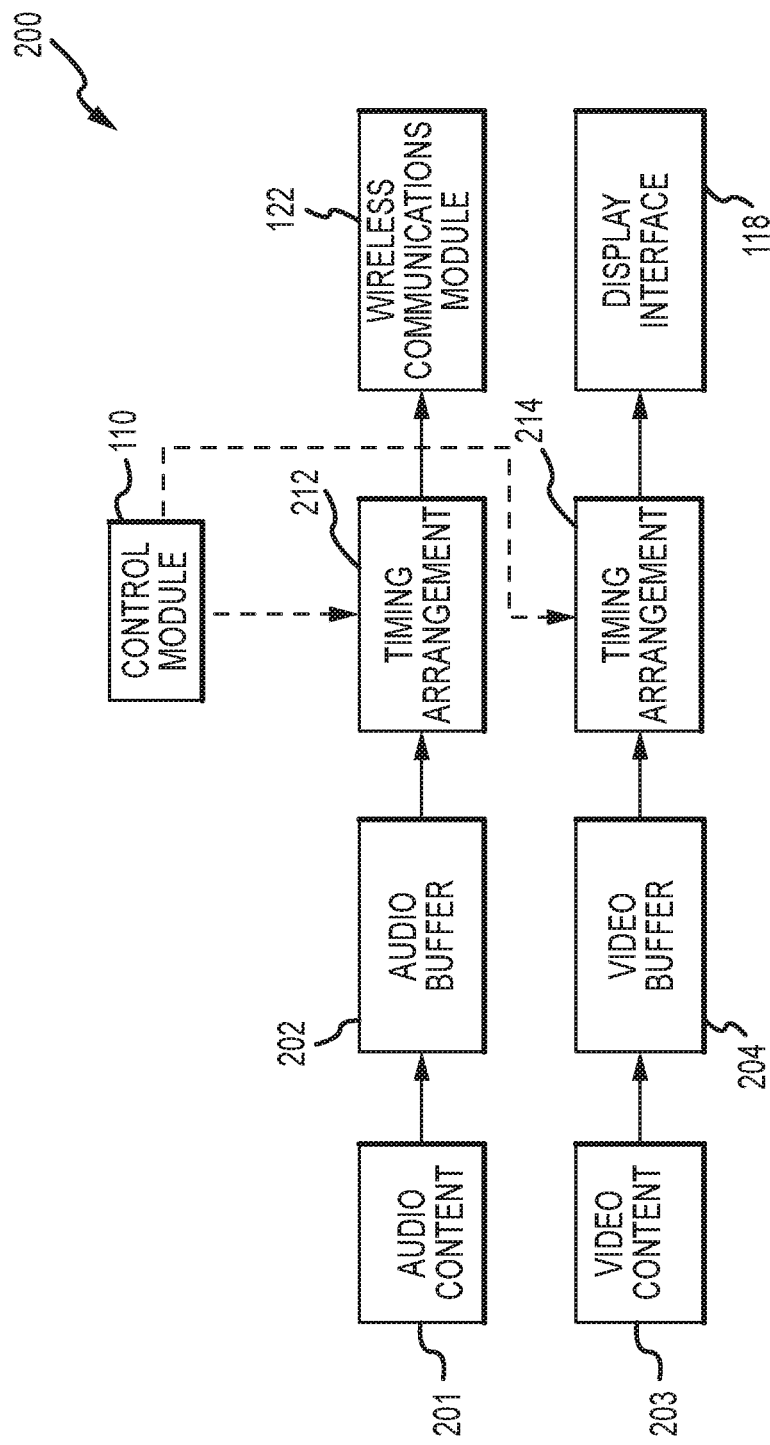
FIG. 2 is a block diagram of a synchronization system suitable for implementation by a media device in the media system of FIG. 1 in accordance with one or more embodiments.

FIG. 2 depicts an exemplary embodiment of a synchronization system 200 suitable for implementation by the media device 104 in the media system 100 of FIG. 1. The synchronization system 200 includes an audio buffer 202 configured to receive the audio portion 201 of the media content being presented by the media device 104 and a video buffer 204 configured to receive the video portion 203 of the media content being presented by the media device 104. The audio buffer 202 is coupled to the wireless communications module 122 of the media device 104 for wirelessly transmitting the audio content from the audio buffer 202 to the audio output device 108. The video buffer 204 is coupled to the display interface 118 of the media device 104 for providing the video content from the video buffer 204 to the display device 102. As illustrated, the audio buffer 202 is coupled to the wireless communications module 122 and the video buffer 204 is coupled to the display interface 118 via respective timing arrangements 212, 214 configured to advance or delay the presentation of the audio content stream from the audio buffer 202 relative to the video content stream from the video buffer 204, or vice versa. In this regard, the control module 110 is coupled to the timing arrangements 212, 214 to delay one of the audio content stream or the video content stream in accordance with the synchronization settings for the audio output device type.

The audio content 201 generally represents the audio portion of either a broadcast media program received from the broadcast source 150 or recorded media program obtained from the DVR 116 that has been selected by a viewer for presentation on the display device 102. Similarly, the video content 203 generally represents the video portion of the broadcast media program or the recorded media program selected for presentation on the display device 102.

Depending on the embodiment, the control module 110, the receiver 114 and/or other components of the media device 104 demultiplex, decompress and/or decode the media content received from a respective source 116, 150 into separate audio and video content streams 201, 203 that are appropriately formatted for reproduction by the respective output device 102, 108. The buffers 202, 204 generally represent data storage elements or portions thereof (e.g., portions of memory 112) configured to temporarily store input content in a first-in first-out (FIFO) manner such that portions of the input content are provided to the wireless communications module 122 or the display interface 118 in chronological order.

The timing arrangements 212, 214 generally represent the hardware, circuitry and/or other components of the media device 104 that are capable of introducing a controllable variable delay in the respective output path from a respective buffer 202, 204. The control module 110 is coupled to the timing arrangements 212, 214 to introduce an offset or delay into one of the output content streams that corresponds to the synchronization settings for the output device 108. In this regard, the delay or offset compensates for the difference in the amount of time between when a portion of the audio content 201 exits the audio buffer 202 and is reproduced at the audio output element 130 and the amount of time between when a portion of the video content 203 exits the video buffer 204 and is reproduced on the display device 102. When the amount of time required to wirelessly transmit the audio content to the audio output device 108 and reproduce the audio content at the audio output device 108 is greater than the amount of time required for the display interface 118 to present the video content on the display device 102, the control module 110 may configure the video timing arrangement 214 to delay the video content 203 by an amount of time corresponding to the time differences associated with reproducing the audio content 201 such that the auditory output presented at the audio output element 130 is substantially synchronized with the video output presented on the display device 102. Conversely, when the amount of time required to wirelessly transmit the audio content to the audio output device 108 and reproduce the audio content at the audio output device 108 is less than the amount of time required for the display interface 118 to present the video content on the display device 102, the control module 110 may configure the audio timing arrangement 212 to delay the audio content 201 by an amount of time corresponding to the relative time difference associated with reproducing video content 203 such that the auditory output presented at the audio output element 130 after being delayed by the audio buffer 202 is substantially synchronized with the video output presented on the display device 102.

FIG. 3 depicts an exemplary embodiment of a synchronization process 300 for synchronizing audio and video presented on separate output devices coupled to a media device, such as media device 104 in the media system 100 of FIG. 1. The various tasks performed in connection with the illustrated process 300 may be implemented using hardware, firmware, software executed by processing circuitry, or any combination thereof. For illustrative purposes, the following description may refer to elements mentioned above in connection with FIGS. 1-2. In practice, portions of the synchronization process 300 may be performed by different elements of a media system 100, such as, for example, the display device 102, the media device 104, the input device 106, the output device 108, the device control module 110, the communications modules 122, and/or the display interface 118. It should be appreciated that the synchronization process 300 may include any number of additional or alternative tasks, the tasks need not be performed in the illustrated order and/or the tasks may be performed concurrently, and/or the synchronization process 300 may be incorporated into a more comprehensive procedure or process having additional functionality not described in detail herein. Moreover, one or more of the tasks shown and described in the context of FIG. 3 could be omitted from a practical embodiment of the synchronization process 300 as long as the intended overall functionality remains intact.

Referring to FIG. 3 with continued reference to FIGS. 1-2, in exemplary embodiments, the synchronization process 300 is automatically initiated by the media device 104 in response to an output device 108 being paired with the media device 104. For example, upon being powered on or otherwise enabled, the audio output device 108 may detect or otherwise identify the presence of the media device 104 (e.g., by performing a discovery procedure or otherwise scanning one or more wireless communications channels). During the pairing process, the media device 104 may obtain identification information for the audio output device 108 and store or otherwise maintain the identification information for the audio output device 108. In exemplary embodiments, the identification information includes model and/or versioning information for the audio output device 108 (e.g., the type of electronic device, make and/or model of electronic device, firmware version, and the like). The identification information may also include, without limitation, an address of the audio output device 108 on the wireless communications channel, a unique identifier associated with the communications module 132 of the audio output device 108 that is used to access the wireless communications channel (e.g., a media access control address, or the like), a unique identifier associated with the audio output device 108, and/or network authentication information (e.g., secure sockets layer (SSL) keys, cryptographic keys, or the like).

In exemplary embodiments, in response to the initial pairing of an output device, the synchronization process 300 obtains or otherwise identifies the device type associated with the output device and downloads or otherwise obtains default synchronization settings for that identified device type (tasks 302, 304). As described above, the media device 104 may obtain the make, model, versioning information, and the like for the audio output device 108 from the audio output device 108 upon establishing an association with the audio output device 108. Thereafter, the media device 104 transmits or otherwise provides a request for synchronization settings to the remote server 140 via the network 107 that includes the make, model, versioning information, and other information identifying the device type for the audio output device 108. Using the device type information, the remote server 140 may access the database 142 to identify or otherwise obtain the default synchronization settings associated with that device type, and transmit or otherwise provide a response to the media device 104 that includes the default synchronization settings associated with the device type for the audio output device 108. In some embodiments, the request provided by the media device 104 may also include make, model, versioning information, and other information identifying the device type for the media device 104 or the display device 102, where the remote server 140 accesses the database 142 to obtain the default synchronization settings associated with the particular combination of device types corresponding to the audio output device 108, the media device 104, and/or the display device 102.

In one or more embodiments, the default synchronization settings are also associated with the communications protocol being utilized to communicate with the output device 108. In this regard, the delays in the audio path from the control module 110 to the audio output element 130 may be influenced by the communications module 122 of the media device 104 being utilized and/or the communications protocol being utilized by that communications module 122. For example, media device 104 may include a first communications module 122 configured to support wireless communications in accordance with the ZigBee® radio frequency for consumer electronics (RF4CE) specification, a second communications module 122 configured to support wireless communications in accordance with a Bluetooth® specification, and a third communications module 122 configured to support communications in accordance with an IEEE 802.11 specification (e.g., Wi-Fi). Thus, each particular communications module 122 and/or communications protocol utilized by the media device 104 to communicate with the audio output device 108 may result in a different amount of delay between the time when the control module 110 receives a portion of audio content 201 (e.g., from the broadcast source 150 or the DVR 116) and the time when that portion of audio content 201 is reproduced by the audio output element 130. Accordingly, the synchronization request provided by the media device 104 may also identify the communications protocol being utilized to communicate with the audio output device 108, and the server 140 may access the database 142 to obtain the default synchronization settings associated with the combination of the device type of the audio output device 108 and the communications protocol being utilized to communicate with the instance of the audio output device 108 being provisioned.

The synchronization process 300 continues by storing or otherwise maintaining the default synchronization settings in association with the paired output device, and while that output device is paired with the media device, delaying one of the audio portion or the video portion of media content being presented in accordance with those default synchronization settings (tasks 306, 308). In this regard, the control module 110 may store or otherwise maintain the default synchronization settings (e.g., in memory 112) in association with the identification information for the audio output device 108. Additionally, the control module 110 automatically configures either the audio timing arrangement 212 to delay the audio content 201 provided to the audio output device 108 or the video timing arrangement 214 to delay the video content 203 provided to the display device 102 based on the default synchronization settings.

As described in greater detail below in the context of FIG. 6 and FIGS. 8-9, when the auditory output produced by other devices of the same device type as the audio output device 108 tends to lag the video output by a particular amount of delay, the default synchronization settings determined by the server 140 may indicate a presentation offset time by which the control module 110 should configure the video timing arrangement 214 to delay the video content 203 and compensate for the amount of delay in the audio path. In such embodiments, the control module 110 automatically implements the default synchronization settings by configuring the video timing arrangement 214 to delay to the video content stream 203 by the offset amount and reduce the likelihood that the video on the display device 102 leads the auditory output produced by the audio output element 130. Conversely, when the auditory output produced by devices of the same device type as the audio output device 108 tends to lead the video output, the default synchronization settings may indicate a presentation offset time by which the control module 110 should configure the audio timing arrangement 212 to delay the audio content 201 and compensate for the amount of delay in the video path. In such embodiments, the control module 110 automatically configures the audio timing arrangement 212 to delay to the audio content stream 201 by the offset amount and reduce the likelihood that the video on the display device 102 lags the auditory output produced by the audio output element 130.

Still referring to FIG. 3, in exemplary embodiments, the synchronization process 300 verifies or otherwise confirms that the default synchronization settings produced synchronized audio and video outputs (task 310). For example, the media device 104 may generate or otherwise provide a GUI display on the display device 102 that includes GUI elements that may be manipulated by the viewer using the input device 106 to confirm that the auditory output produced by the audio output element 130 is perceived to be synchronized with the video output presented on the display device 102. In response to receiving an indication that the audio and video outputs are not synchronized, the synchronization process 300 generates or otherwise provides a GUI display including GUI elements that may be manipulated to adjust the synchronization settings, receiving user input indicative of a desired adjustment to the synchronization settings, and adjusting the delay of either the audio portion or the video portion of media content being presented in accordance with the adjusted synchronization settings (tasks 312, 314, 316). The loop defined by tasks 310, 312, 314, and 316 may repeat to dynamically adjust the synchronization settings being used to present audio and video content until the user perceives the audio output and the video output to be synchronized. Once the audio output and the video output are perceived to be synchronized with one another, the viewer may provide confirmation that the current synchronization settings produce synchronized outputs.

In response to receiving confirmation that the audio and video outputs are synchronized, the synchronization process 300 transmits or otherwise uploads the synchronization settings that are confirmed to produce synchronized audiovisual content to the remote server (task 318). In this regard, the media device 104 transmits or otherwise provides, to the server 140 via the network 107, the presentation offset or delay between the audio and video content that was selected by the viewer or otherwise indicated as resulting in synchronized output. In response to receiving the adjusted synchronization settings from the media device 104, the server 140 updates the database 142 to store or otherwise maintain, in association with the instance of the media device 104 and the instance of the audio output device 108, those adjusted synchronization settings associated with presenting synchronized audiovisual content using the audio output device 108. As described in greater detail below, in exemplary embodiments, the server 140 utilizes the adjusted synchronization settings received from the media device 104 to update the default synchronization settings for provisioning subsequent instances of the same output device type (or the same combination of output device type and media device type) in a manner that reflects the adjusted synchronization settings.

FIG. 4 depicts an exemplary GUI display 400 that may be presented by the media device 104 on the display device 102 in conjunction with the synchronization process 300 of FIG. 3. After configuring the buffers 202, 204 to implement the default synchronization settings downloaded from the server 140, the control module 110 may automatically generate the GUI display 400 on the display device 102 that prompts the viewer to confirm whether the auditory output produced by the audio output element 130 is synchronized with the video content 410 presented on the display device 102. The GUI display includes GUI elements 402, 404 that allow the viewer to verify or otherwise confirm that the video content 410 currently presented on the display device 102 is synchronized with the audio content currently being produced by the audio output element 130. Depending on the embodiment, the video content 410 may correspond to the video content of a live broadcast media program available from the broadcast source 150 or the video content of a recorded broadcast media program available on the DVR 116.

Turning now to FIG. 5, in response to the viewer selecting a GUI element 404 to indicate that the output audio and video are not synchronized, the control module 110 generates an updated GUI display 500 that includes one or more GUI elements 502, 504 that allow the viewer to adjust or otherwise modify the synchronization settings. For example, the GUI display 500 may include a slider 502 that includes a slider bar 504 (or other graphical adjustment element) having a position along the slider path that corresponds to the current amount of offset being implemented by the timing arrangements 212, 214. In response to the viewer manipulating the input device 106 to adjust the position of the slider bar 504, the control module 110 may automatically adjust the offset implemented by the timing arrangements 212, 214 in a corresponding manner. In this regard, the delay or offset between the auditory output produced by the audio output element 130 and the video output presented on the display device 102 may be dynamically adjusted in a manner corresponding to the viewer's adjustments to the position of the slider bar 504 on the path of the slider 502. Accordingly, the viewer may increase or decrease the delay of the video content stream 203 relative to the audio content stream 201, or vice versa, until the auditory output from the audio output element 130 is perceived to be synchronized with the video content 410 on the display device 102. Once the viewer perceives synchronized audiovisual content, the viewer may manipulate or otherwise select the GUI element 402 to confirm or otherwise indicate that the audio output and the video output are synchronized. In response to receiving indication of synchronized outputs, the control module 110 stores or otherwise maintains the current synchronization settings in memory 112 in association with the audio output device 108 and uploads or otherwise transmits the current synchronization settings to the remote server 140 via the network 107.

FIG. 6 depicts an exemplary embodiment of a provisioning process 600 for configuring media devices with synchronization settings for presenting synchronized audiovisual content using separate audio and video output devices. The various tasks performed in connection with the illustrated process 600 may be implemented using hardware, firmware, software executed by processing circuitry, or any combination thereof. For illustrative purposes, the following description may refer to elements mentioned above in connection with FIGS. 1-2. In practice, portions of the provisioning process 600 may be performed by different elements of a media system 100, such as, for example, the server 140, the database 142, the media device 104, and/or the media device control module 110. It should be appreciated that the provisioning process 600 may include any number of additional or alternative tasks, the tasks need not be performed in the illustrated order and/or the tasks may be performed concurrently, and/or the provisioning process 600 may be incorporated into a more comprehensive procedure or process having additional functionality not described in detail herein. Moreover, one or more of the tasks shown and described in the context of FIG. 6 could be omitted from a practical embodiment of the provisioning process 600 as long as the intended overall functionality remains intact.

Referring to FIG. 6, and with continued reference to FIG. 1, the provisioning process 600 receives or otherwise obtains, from a media device paired with a particular type of output device, synchronization settings for presenting synchronized audiovisual content using that particular instance of that output device paired with that media device (task 602). The provisioning process 600 then stores or otherwise maintains the synchronization settings in association with that instance of that particular output device type (task 604). For example, as described above in the context of FIGS. 3-5, a media device 104 may upload or otherwise transmit, to the server 140 via the network 107, device type information (e.g., make, model, versioning information, and the like) associated with its paired output device 108 along with the synchronization settings that have been confirmed to produce synchronized audio and visual content. In exemplary embodiments, the server 140 stores or otherwise maintains received synchronization settings in association with the output device type information in the database 142. For example, the database 142 may maintain a table or another suitable data structure that includes a row or entry for each instance of a particular type of output device in the media system 100, where the entry includes the synchronization settings received for that respective instance of that output device type from its paired media device. In embodiments where the synchronization settings are also associated with the particular communications protocol and/or communications module 122 of the media device 104 being utilized, the media device 104 also uploads or otherwise transmits, to the server 140 via the network 107, identification of the communications protocol and/or communications module 122 being utilized along with the device type information and the synchronization settings. Thus, the server 140 may store or otherwise maintain received synchronization settings in association with the output device type information and the communications configuration information in the database 142.

The illustrated process 600 continues by obtaining stored synchronization settings previously received for other instances of that particular type of output device and calculates or otherwise determines updated default synchronization settings for that output device type based on the synchronization settings received for the new instance of that output device type and the synchronization settings previously received for other instances of that output device type (tasks 606, 608). In this regard, the server 140 may obtain, from the database 142, any stored synchronization settings associated with a particular type of output device. Thereafter, the server 140 calculates or otherwise determines default synchronization settings that are representative of the synchronization settings received for all of the various instances of that particular output device type. In exemplary embodiments, the default synchronization settings are determined such that they are most likely to result in audio and video outputs that are perceived to be synchronized when provisioning a subsequent instance of the output device type without any manual adjustments by a viewer. For example, for each respective instance of the output device type, the synchronization settings may include a relative offset for presenting video content with respect to audio content for that respective instance. The server 140 may average the respective offset values for the respective instances of the output device to obtain an average offset for presenting synchronized audiovisual content using that output device type for provisioning subsequent instances of that output device type for producing synchronized audiovisual content. In this regard, as new synchronization settings a received for new instances of that output device type, the server 140 dynamically updates the default synchronization settings to reflect the new synchronization settings.

In exemplary embodiments, in response to identifying a new instance of a particular type of output device being paired within the media system, the provisioning process 600 automatically obtains the current default synchronization settings for that particular output device type and automatically transmits or otherwise provides those default synchronization settings to the media device being paired with that new instance of the output device type (tasks 610, 612). For example, as described above in the context of FIG. 3, in response to an output device 108 being paired with a media device 104, the media device 104 may transmit or otherwise provide, to the server 140, a request for synchronization information that includes the device type information for the output device 108 (e.g., make, model, version, and the like). Using the device type information, the server 140 access the database 142 to retrieve or otherwise obtain the most up-to-date default synchronization settings associated with that output device type. The server 140 automatically transmits or otherwise provides the obtained default synchronization settings to the media device 104 in response to the synchronization information request. As described above, the media device 104 automatically configures its timing arrangements 212, 214 to implement the default synchronization settings. When the viewer does not perceive the default synchronization settings as producing synchronized audio and video outputs, the viewer may interact with the media device 104 to arrive at adjusted synchronization settings that the viewer perceives as producing synchronized audio and video outputs. Thereafter, the media device 104 may automatically upload or otherwise transmit the viewer-adjusted synchronization settings to the server 140.

In response to receiving adjusted synchronization settings from a media device, the provisioning process 600 repeats the steps storing the adjusted synchronization settings in association with that instance of that particular output device type and calculating or otherwise determining updated default synchronization settings for that output device type based on the adjusted synchronization settings and the stored synchronization settings previously received for other instances of that output device type (tasks 604, 606, 608). In this manner, the server 140 dynamically updates the default synchronization settings for a particular output device type in response to adjustments made by viewers for various instances of the output device type within the media system 100 to increase the likelihood that the default synchronization settings will result in synchronized audio and video outputs upon provisioning subsequent instances of the output device type without manual adjustments by the viewers associated with those subsequent instances. Thus, the user experience for subsequent instances is improved by reducing the likelihood that other viewers will want or need to manually configure the presentation offset upon pairing an audio output device 108 with a media device 104 while at the same time increasing the likelihood that the auditory output produced by the audio output device 108 will be synchronized as closely as possible with the corresponding video output presented on the display device 102.

Figure 7:
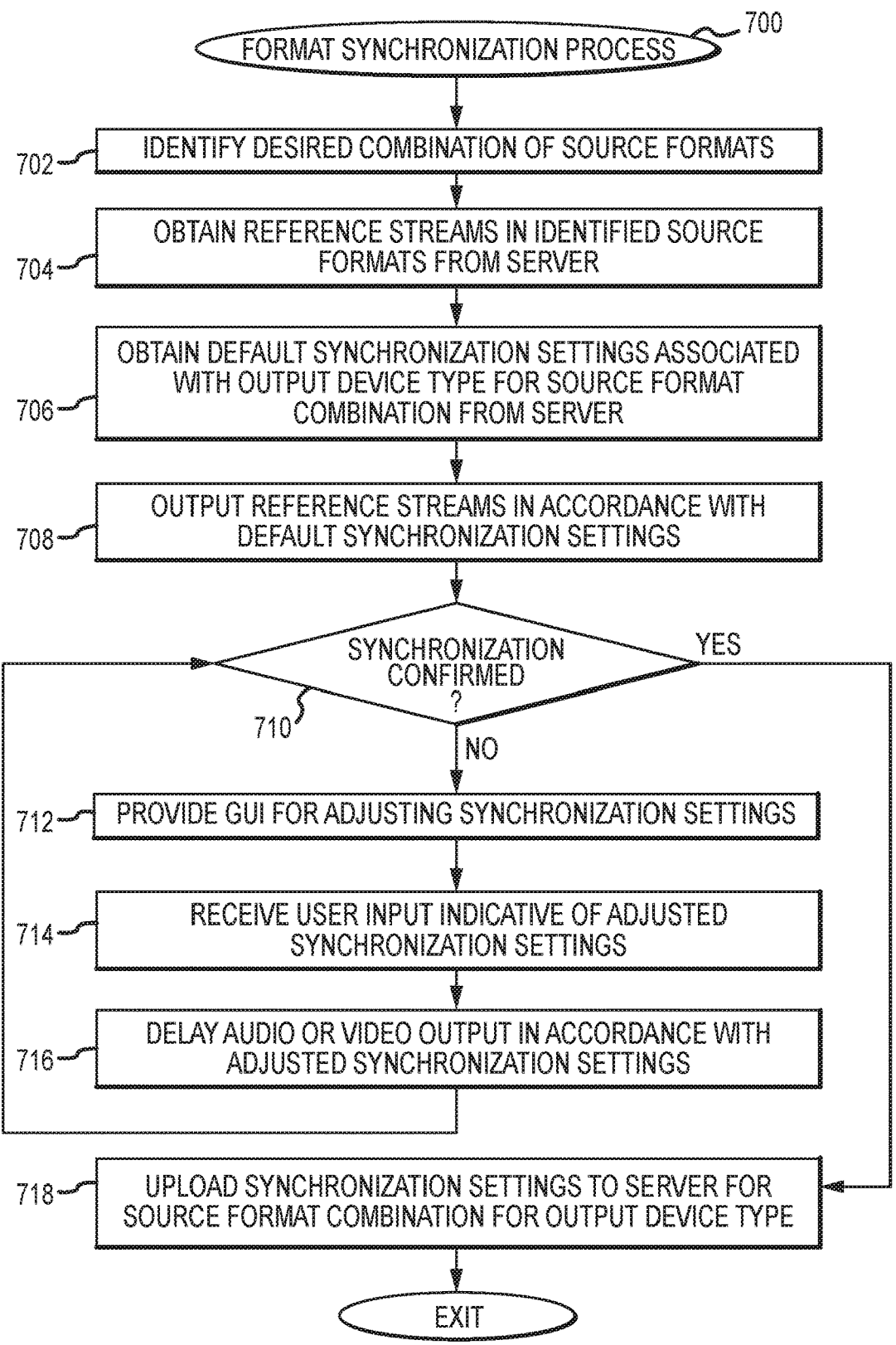
FIG. 7 is a flowchart of an exemplary format synchronization process suitable for use with the media system of FIG. 1 in accordance with one or more embodiments.

FIG. 7 depicts an exemplary embodiment of a format-specific synchronization process 700 for configuring media devices with synchronization settings that are specific to the formats of the audiovisual content to be presented. The various tasks performed in connection with the illustrated process 700 may be implemented using hardware, firmware, software executed by processing circuitry, or any combination thereof. For illustrative purposes, the following description may refer to elements mentioned above in connection with FIGS. 1-2. In practice, portions of the format synchronization process 700 may be performed by different elements of a media system 100, such as, for example, the display device 102, the media device 104, the input device 106, the output device 108, the device control module 110, the communications modules 122, the display interface 118, the server 140, and/or the database 142. It should be appreciated that the format synchronization process 700 may include any number of additional or alternative tasks, the tasks need not be performed in the illustrated order and/or the tasks may be performed concurrently, and/or the format synchronization process 700 may be incorporated into a more comprehensive procedure or process having additional functionality not described in detail herein. Moreover, one or more of the tasks shown and described in the context of FIG. 7 could be omitted from a practical embodiment of the format synchronization process 700 as long as the intended overall functionality remains intact.

Referring to FIG. 7, and with continued reference to FIGS. 1-2, in one or more exemplary embodiments, the format synchronization process 700 is initiated in response to a viewer manipulating the input device 106 to indicate a desire to perform additional adjustments to the synchronization settings implemented by the media device 104 for the output device 108. For example, the media device 104 may present one or more menu GUI displays that the viewer may manipulate or otherwise interact with to provide an indication of a desire to manually configure the synchronization settings for particular source file formats or combinations thereof. In this regard, the delays associated with the audio reproduction path may vary depending on the format (e.g., the encoding format, the bitrate, and the like) of the audio content 201, and similarly, delays associated with the video path may vary depending on the format (e.g., the resolution, the scanning type, the frame rate, and the like) of the video content 203. For example, the duration of time associated with the control module 110 and the display interface 118 processing and presenting video content received from the broadcast source 150 in the H.264 encoding format (e.g., MPEG-4 Part 10 or Advanced Video Coding) with 1080 horizontal lines of vertical resolution and progressive scanning (1080p) may be different from the duration of time associated with the control module 110 and the display interface 118 processing and presenting video content received from the broadcast source 150 in the MPEG-2 encoding format with 1080 horizontal lines of vertical resolution and interlaced scanning (1080i). Likewise, the duration of time associated with the control modules 110, 134 and communications modules 122, 132 processing, communicating, and presenting audio content received from the broadcast source 150 in the advanced audio coding (AAC) format may be different from the duration of time associated with the control modules 110,134 and communications modules 122, 132 processing, communicating, and presenting audio content received from the broadcast source 150 in the MPEG-2 Audio Layer III (MP3) format. Thus, different combinations of audio and video source formats received from the broadcast source 150 may or may not be perceived to be as synchronized as desired by the viewer when format-independent default synchronization settings are utilized.

The illustrated process 700 identifies or otherwise determines the desired combination of audio and video source formats to be configured and downloads or otherwise obtains reference content streams in the identified source formats (tasks 702, 704). In this regard, the viewer may utilize the input device 106 to manipulate or otherwise select the desired source audio format and the desired source video format to be configured from one or more lists of possible formats (or combinations thereof) on GUI display presented by the control module 110 on the display device 102. In other embodiments, the control module 110 may identify the desired combination by sequentially progressing through all of the possible source format combinations. After identifying the desired source formats to be configured, the control module 110 transmits or otherwise provides, to the server 140, a request for reference content streams in those formats. In this regard, the server 140 may store or otherwise maintain, in the database 142, sample content files in the various possible formats that may be utilized by the broadcast content source 150. For example, in response to receiving a request from the media device 104 that identifies AAC formatted audio and 1080p H.264 video as the source format combination being configured, the server 140 access the database 142 to obtain, from the database 142, a reference video file for 1080p video in the H.264 format along with a reference audio file in the AAC format that corresponds to the video content of the reference video file. Thereafter, the server 140 transmits or otherwise provides the reference audio and video files to the media device 104 via the network 107 in response to the format configuration request.

In one or more exemplary embodiments, the format synchronization process 700 also downloads or otherwise obtains default synchronization settings for the identified combination of source formats (task 706). In this regard, in some embodiments, the database 142 may store or otherwise maintain format-specific synchronization settings for the various instances of media devices and paired output devices in the media system 100, and the server 140 may calculate or otherwise determine format-specific default synchronization settings for a particular output device type. For example, each entry in a table in the database 142 corresponding to an instance of a particular type of output device may include information identifying the corresponding audio format and video format in addition to the information identifying the output device type. Using the device type information and the format information, the remote server 140 may access the database 142 to obtain stored synchronization settings associated with instances of a particular output device type for a particular combination of audio and video source formats and calculate or otherwise determine default synchronization settings for that combination of audio and video source formats for that output device type. In response to the format configuration request from the media device 104, the server 140 may transmit or otherwise provide, to the media device 104, the default synchronization settings for the device type associated with the output device 108 for the combination of audio and video source formats identified in the format configuration request in addition to the reference content files for the identified source format combination.

The format synchronization process 700 continues by delaying one of the audio portion or the video portion of media content being presented in accordance with the default synchronization settings for that format combination (task 708). In this regard, the control module 110 may automatically configure the video timing arrangement 214 to delay the video content 203 corresponding to the reference video file in the identified video source format by an offset amount indicated by the default synchronization settings associated with the combination of that video source format and the identified audio source format for the device type associated with the output device 108. Alternatively, the control module 110 configures the audio timing arrangement 212 to delay the audio content 201 corresponding to the reference audio file in the identified audio source format in accordance with the default synchronization settings for the source format combination.

In a similar manner as described above in the context of FIG. 3, the format synchronization process 700 generates or otherwise provides a GUI display for adjusting the synchronization settings and adjusts the delay of either the audio reference file content or the video reference file content being presented in response to user input indicative of a desired adjustment to the synchronization settings until the viewer verifies or otherwise confirms that the audio output and the video output are synchronized (tasks 710, 712, 714, 716). In some embodiments, the control module 110 repeats or loops the playback of the audio and video content corresponding to the reference files as the viewer adjusts the offset between the audio and the video. Alternatively, the control module 110 may reset or restart the processes of providing the audio content 201 corresponding to the audio reference file to the audio output device 108 and providing the video content 203 corresponding to the video reference file to the display device 102 after the viewer makes an adjustment to the offset between the audio and the video.

Once the audio output corresponding to the reference audio file is perceived to be synchronized with the video output corresponding to the reference video file, the viewer provides confirmation that the current synchronization settings produce synchronized outputs for the current audio and video source formats. Thereafter, when the control module 110 receives a media program from a content source 116, 150, the control module 110 identifies the source format combination that the received media program is encoded or otherwise encapsulated in, identifies or otherwise obtains the synchronization settings associated with that format combination, and configures the timing arrangements 212, 214 to implement those synchronization settings specific to that source format combination.

In response to receiving confirmation that the audio and video outputs are synchronized, the format synchronization process 700 transmits or otherwise uploads the synchronization settings that are confirmed to produce synchronized audiovisual content for the identified source format combination to the remote server (task 718). In this regard, the media device 104 transmits or otherwise provides, to the server 140 via the network 107, the offset or delay between the audio and video content that was selected by the viewer for the combination of audio and video source formats. In response, the server 140 may update the database 142 to store or otherwise maintain, in association with the instance of the media device 104 and the instance of the audio output device 108, the synchronization settings associated with presenting synchronized audiovisual content using the audio output device 108 with the identified source format combination. Thereafter, the server 140 may utilize the adjusted synchronization settings received from the media device 104 to update the default synchronization settings for that identified source format combination for that output device type in a manner that reflects the adjusted synchronization settings received from the media device 104. In this manner, the server 140 may determine default synchronization settings that are specific to a particular combination of audio and video source formats as well as being specific to a particular output device type and/or a particular media device type.

FIG. 8 depicts an exemplary sequence 800 of communications within the media system 100 of FIG. 1 in conjunction with the synchronization process 300 of FIG. 3 and the provisioning process 600 of FIG. 6 in accordance with one or more exemplary embodiments. The exemplary sequence 800 depicts an embodiment where multiple instances 802, 804, 806 of media device 104 are paired with multiple different instances of the audio output device 108. It should be appreciated that FIG. 8 depicts merely one simplified representation of a communications sequence for purposes of explanation and is not intended to limit the subject matter described herein in any way. In practice, any number of instances of the media device 104 may be present in an embodiment of the media system 100, and those instances may be paired with any number or type of output device 108.

Referring to FIG. 8, and with continued reference to FIGS. 1-7, the illustrated sequence 800 begins with a first media device 802 transmitting or otherwise providing 810 a synchronization request to the server 140 in response to being paired with an instance of a particular output device type. In response to the request, the server 140 retrieves or otherwise obtains 812 default synchronization settings for that identified device type from the database 142. In some embodiments, the default synchronization settings may also be associated with the communications configuration being utilized by the media device 802 and/or a particular source format combination to be presented by the media device 802. In exemplary embodiments, the default synchronization settings are based on stored synchronization settings for other instances of that particular output device type within the media system 100. The server 140 transmits or otherwise provides 814 those default synchronization settings to the media device 802, which, in turn, configures itself for presenting audiovisual content in accordance with the default synchronization settings (e.g., by configuring the timing arrangements 212, 214 to implement the identified offset). Thereafter, a viewer may interact with the media device 802 to modify or otherwise adjust the synchronization settings to improve the perceived synchronicity among the audio and video outputs produced by the respective instances of video and audio output devices 102, 108 associated with the media device 802. The media device 802 transmits, uploads, or otherwise provides 816 the adjusted synchronization settings to the server 140, which, in turn, stores 818 the adjusted synchronization settings in association with the instance of the output device 108 and the media device 802. Additionally, the server 140 may calculate or otherwise determine updated default synchronization settings for the output device type based on the adjusted synchronization settings received 816 from the media device 802 and store or otherwise maintain 818 those updated default synchronization settings for the output device type in the database 142.

In the illustrated sequence 800, another instance 804 of the media device 104 subsequently transmits or otherwise provides 820 a synchronization request to the server 140 in response to being paired with another instance of an output device 108 having the same make, model, version, and the like as was paired with the first media device 802. In response to the request, the server 140 retrieves or otherwise obtains 822 default synchronization settings for that identified device type from the database 142. In this regard, the obtained synchronization settings are the updated default synchronization settings determined by the server 140 based on the adjusted synchronization settings received 816 from the media device 802. The server 140 transmits or otherwise provides 824 those current default synchronization settings to the second media device 804, which, in turn, configures itself for presenting audiovisual content in accordance with those received default synchronization settings. Thereafter, a viewer associated with the second media device 804 may interact with the second media device 804 to modify or otherwise adjust the synchronization settings to improve the perceived synchronicity among the audio and video outputs produced by the respective instances of video and audio output devices 102, 108 associated with the second media device 804. The media device 804 transmits, uploads, or otherwise provides 826 its adjusted synchronization settings to the server 140, which, in turn, stores 828 the adjusted synchronization settings in association with the instance of the output device 108 and the second media device 804. Additionally, the server 140 may again calculate or otherwise determine updated default synchronization settings for the output device type based on the adjusted synchronization settings received 826 from the second media device 804 and store or otherwise maintain 828 those updated default synchronization settings for the output device type in the database 142. In this manner, the default synchronization settings for the output device type are dynamically updated such that they are influenced by both the adjusted synchronization settings received 826 from the second media device 804 and the adjusted synchronization settings received 816 from the first media device 802.

Another instance 806 of the media device 104 may subsequently transmit or otherwise provide 830 a synchronization request to the server 140 in response to being paired with another instance of an output device 108 having the same make, model, version, and the like as was paired with the other media devices 802, 804. In a similar manner as described above, the server 140 obtains 832 the current default synchronization settings for that identified device type that reflect both the adjusted synchronization settings received 826 from the second media device 804 and the adjusted synchronization settings received 816 from the first media device 802, and provides 834 those current default synchronization settings to the third media device 806. The third media device 806 configures itself for presenting audiovisual content in accordance with the current default synchronization settings for the output device type. In this regard, as the number of instances of that output device type increases and the number of synchronization settings maintained by the database 142 increases, the dynamically updated default synchronization settings may converge towards a setting that does not necessarily require any further manual adjustment.

When a viewer associated with the third media device 806 perceives the audio content reproduced by its instance of audio output device 108 to be synchronized with the video content presented on its associated display device 102, the viewer may interact with the third media device 806 to provide confirmation that the default synchronization settings result in synchronized audio and video outputs. For example, when the user first pairs a wireless audio output device 108 he or she can be asked (e.g., by the media device 104 via a GUI on the display 102) if they are satisfied with the audio synchronization with the video they are watching. If the user indicates satisfaction (e.g., he or she selects a button labeled "YES"), those default synchronization settings may be utilized as a valid point of data for use in calculating the synchronization settings for that type of wireless audio output device. In such embodiments, the third media device 806 may transmit or otherwise provide 836 confirmation to the server 140 that the current default synchronization settings were not perceived as requiring any further manual adjustment, and the server 140 may store 838 the current default synchronization settings in association with the instance of the output device 108 and the third media device 806 in the database 142. In various embodiments, the server 140 may also monitor, track, or record performance data indicative of the relative success of the default synchronization settings it has determined. In this regard, based on the performance of the default synchronization settings (e.g., the rate or frequency of acceptance without additional user modifications), the server 140 may dynamically and/or intelligently modify the algorithms or techniques used to determine the default synchronization settings to further improve the default synchronization settings, and thereby, improve the user experience. In some embodiments, as the default synchronization settings are updated or otherwise improved, the server 140 may automatically push or otherwise transfer updated default synchronization settings to media devices (e.g., the third media device 806) that have previously indicated satisfaction with the default synchronization settings or have otherwise failed to make any manual adjustments to the synchronization settings. Thus, these users may be automatically provided with the most up-to-date synchronization settings for their respective paired output devices.

FIG. 9 depicts a block diagram representative of a media system 900 illustrating the manner in which a remote server 940 may determine default synchronization settings 942 based on respective synchronization settings 903, 905, 907 associated with different instances 902, 904, 906 of a media device 104. For example, the viewer-adjusted synchronization settings 903 associated with a first STB 902 (which may be stored in a database 142 as described above) may indicate an offset of +60 milliseconds (e.g., the viewer perceives unadjusted audio as lagging the video by 60 milliseconds) for an instance of a first audio output device type ('Headphone Model A') paired with the STB 902 and an offset of +20 milliseconds for an instance of a second audio output device type ('Headphone Model B') paired with the STB 902. The viewer-adjusted synchronization settings 905 associated with a second STB 904 may indicate an offset of +20 milliseconds for an instance of the first audio output device type paired with the STB 904 and an offset of +10 milliseconds for an instance of the second audio output device type paired with the STB 904. The viewer-adjusted synchronization settings 907 associated with a third STB 906 may indicate an offset of −20 milliseconds (e.g., the viewer perceives unadjusted audio as leading the video by 20 milliseconds) for an instance of the first audio output device type paired with the STB 906.

In the illustrated embodiment of FIG. 9, to determine the default synchronization settings 942, the server 940 may obtain the offsets for each respective instance of a particular output device type from the synchronization settings 903, 905, 907 and average those offsets to obtain a default offset for that particular output device type. In this regard, the server 940 determines a default offset for Headphone Model A of +20 milliseconds by averaging the respective offsets for Headphone Model A associated with the three STBs 902, 904, 906. Similarly, the server 940 determines a default offset for Headphone Model B of +15 milliseconds by adding the respective offsets for Headphone Model A associated with the two STBs 902, 904. The server 940 may store or otherwise maintain those default synchronization settings 942 in a database (e.g., database 142) and provided to another STB in response to that STB being paired with Headphone Model A or Headphone Model B.

Still referring to FIG. 9 and with reference to FIGS. 1 and 6, in some embodiments, the server 140, 940 may determine default synchronization settings associated with a particular instance of a media device 104 for pairing that media device 104 with an output device type for which the server 140, 940 and/or database 142 does not already maintain synchronization settings for. For example, the STB 902 may be paired with a new output device type (e.g., 'Headphone Model C') for which the server 140, 940 and/or database 142 does not maintain any synchronization information from any other media devices 104 within the media system 100, 900. In response, the server 140, 940 may obtain the various default synchronization settings associated with that particular instance of media device 104 and determine default synchronization settings specific to that instance of media device 104 for provisioning the new output device type. For example, the server 940 may determine a default offset for STB 902 of +40 milliseconds by averaging the respective offsets for the different output devices previously paired with the STB 902. In response to a synchronization request from the STB 902 identifying new Headphone Model C, the server 940 may provide the default offset for STB 902 for use with Headphone Model C.

To briefly summarize, the subject matter described herein allows for synchronized audio and video content to be reproduced using separate output devices in a manner that reduces the likelihood that viewers will be required to manually configure the synchronization upon initially pairing a new output device with a media device by using synchronization settings representative of multiple instances of that output device that have been previously paired and synchronized with other media devices in a media system. As a result, the user experience is improved. Moreover, viewers may manually configure synchronization settings for various combinations of source formats, communications configurations, and the like, thereby improving the user experience during subsequent operation of the media device.

The general systems, structures and techniques described above may be inter-combined, enhanced, modified and/or otherwise implemented to provide any number of different features. In particular, the term "exemplary" is used herein to represent one example, instance or illustration that may have any number of alternates. Any implementation described herein as "exemplary" should not necessarily be construed as preferred or advantageous over other implementations.

For the sake of brevity, conventional techniques related to wireless communications, pairing devices, audio reproduction, video reproduction, content formats or encoding, file structures, buffering, and other functional aspects of the systems (and the individual operating components of the systems) may not be described in detail herein. The subject matter may be described herein in terms of functional and/or logical block components, and with reference to symbolic representations of operations, processing tasks, and functions that may be performed by various computing components or devices. It should be appreciated that in alternative embodiments the various block components shown in the figures may be equivalently realized by any number of components configured to perform the specified functions. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus is not intended to be limiting. For example, terms such as "first," "second" and other such numerical terms referring to structures do not imply a sequence or order unless clearly indicated by the context.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Accordingly, details of the exemplary embodiments or other limitations described above should not be read into the claims absent a clear intention to the contrary.

What is claimed is:

1. A method of provisioning an audio output device, the method comprising:
   providing, by a media device, video content of a media program to a display device coupled to a display interface of the media device;
   providing, by the media device, audio content of the media program to the audio output device, wherein the providing of the audio content to the audio output device by the media device is delayed or advanced relative to the providing of the video content to the display device by the media device in accordance with synchronization settings;
   providing, by the media device, a graphical user interface display on the display device coupled to the display interface of the media device concurrent to the video content, wherein the graphical user interface display includes a graphical adjustment element manipulable to adjust the synchronization settings; and
   in response to user input adjusting a position of the graphical adjustment element, dynamically adjusting a delay or offset between the providing of the audio content to the audio output device and the providing of the video content to the display device by the media device in accordance with adjusted synchronization settings corresponding to an adjustment to the position of the graphical adjustment element.

2. The method of claim 1, wherein providing the graphical user interface display comprises the media device providing the graphical user interface display after configuring audio and video buffers of the media device to implement the synchronization settings.

3. The method of claim 2, further comprising identifying, by the media device, a device type associated with the audio output device, wherein the synchronization settings comprise default synchronization settings associated with the device type.

4. The method of claim 1, further comprising providing, by the media device, an initial graphical user interface display including one or more graphical user interface elements to verify the audio content is synchronized with the video content, wherein providing the graphical user interface display comprises the media device providing an updated graphical user interface display including the graphical adjustment element in response to a viewer selecting one of the one or more graphical user interface elements to indicate that the audio content and the video content are not synchronized.

5. The method of claim 4, further comprising configuring, by the media device, audio and video buffers of the media device to implement the synchronization settings prior to providing the initial graphical user interface display.

6. The method of claim 5, further comprising identifying, by the media device, a device type associated with the audio output device, wherein the synchronization settings comprise default synchronization settings associated with the device type.

7. The method of claim 1, wherein the graphical adjustment element comprises a slider.

8. The method of claim 7, wherein the slider comprises a slider bar having the position along a slider path.

9. The method of claim 8, wherein the delay or offset between auditory output produced by the audio output device and video output presented on the display device is dynamically adjusted in a manner corresponding to adjustments to the position of the slider bar on the slider path.

10. The method of claim 1, the graphical user interface display including a second graphical user interface element selectable to indicate auditory output produced by the audio output device and video output presented on the display device are synchronized, the method further comprising storing, by the media device, the adjusted synchronization settings in association with the audio output device in response to selection of the second graphical user interface element.

11. The method of claim 1, the graphical user interface display including a second graphical user interface element selectable to indicate auditory output produced by the audio output device and video output presented on the display device are synchronized, the method further comprising uploading, by the media device, the adjusted synchronization settings to a remote server via a network in response to selection of the second graphical user interface element.

12. The method of claim 1, further comprising identifying, by the media device, a device type associated with the audio output device, wherein the synchronization settings comprise default synchronization settings associated with the device type.

13. The method of claim 1, wherein:
   the media device comprises a set-top box;
   the audio output device and the display device are separate; and
   providing the audio content comprises the set-top box wirelessly transmitting the audio content from an audio buffer to the audio output device.

14. The method of claim 1, further comprising uploading, by the media device to a server via a network, the adjusted synchronization settings, wherein the server determines updated default synchronization settings for a device type associated with the audio output device based on the adjusted synchronization settings and stored synchronization settings previously received for other instances of the device type.

15. The method of claim 14, the position of the graphical adjustment element indicating an adjusted offset, wherein:
   one of the audio content and the video content is delayed relative to the other of the audio content and the video content based on the adjusted offset in response to the adjustment to the position of the graphical adjustment element; and
   the server determines the updated default synchronization settings for the device type based on the adjusted offset.

16. The method of claim 1, further comprising:
   downloading, by the media device from a server, a reference audio file in a source audio format and a reference video file in a source video format, wherein the synchronization settings comprise default synchronization settings for the combination of the source audio format and the source video format;

delaying, by the media device, one of the audio content corresponding to the reference audio file and the video content corresponding to the reference video file by an offset indicated by the default synchronization settings; and repeating, by the media device, playback of the audio content corresponding to the reference audio file and the video content corresponding to the reference video file in response to the adjustment to the position of the graphical adjustment element.

17. A media device comprising:
a wireless communications module to communicate with an audio output device;
a display interface; and
a control module coupled to the wireless communications module, the display interface, and a network to:
provide video content of a media program to the display interface for presentation on a display device;
provide audio content of the media program to the wireless communications module for transmission to the audio output device, wherein the providing of the audio content to the wireless communications module is delayed or advanced relative to the providing of the video content to the display interface based on synchronization settings;
provide a graphical user interface display to the display interface for presentation on the display device concurrent to the video content, wherein the graphical user interface display includes a graphical adjustment element manipulable to adjust the synchronization settings; and
in response to user input adjusting a position of the graphical adjustment element, dynamically adjust a delay or offset between the providing of the audio content to the wireless communications module and the providing of the video content to the display interface in accordance with adjusted synchronization settings corresponding to an adjustment to the position of the graphical adjustment element.

18. The media device of claim 17, further comprising:
an audio buffer coupled to the wireless communications module via a timing arrangement to buffer the audio content provided to the wireless communications module; and
a video buffer coupled to the display interface to buffer the video content provided to the display interface, wherein:
the synchronization settings comprise an offset; and
the control module is coupled to the timing arrangement to delay the audio content relative to the video content by the offset.

19. The media device of claim 17, wherein the graphical adjustment element comprises a slider comprising a slider bar having the position along a slider path.

20. The media device of claim 17, wherein:
the wireless communications module communicates with the audio output device in accordance with a communications protocol; and
the synchronization settings are associated with the communications protocol.

* * * * *